United States Patent
Tajima

(10) Patent No.: US 9,885,970 B2
(45) Date of Patent: Feb. 6, 2018

(54) SEMICONDUCTIVE ROLLER

(71) Applicant: SUMITOMO RUBBER INDUSTRIES, LTD., Kobe-shi, Hyogo (JP)

(72) Inventor: Kei Tajima, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 91 days.

(21) Appl. No.: 14/718,261

(22) Filed: May 21, 2015

(65) Prior Publication Data

US 2015/0362854 A1 Dec. 17, 2015

(30) Foreign Application Priority Data

Jun. 13, 2014 (JP) ................................ 2014-122556

(51) Int. Cl.
*G03G 15/02* (2006.01)
*C08L 71/03* (2006.01)

(52) U.S. Cl.
CPC .......... *G03G 15/0233* (2013.01); *C08L 71/03* (2013.01)

(58) Field of Classification Search
CPC .. G03G 15/0241; G03G 15/0233; B24B 1/00; B24B 1/007; B24B 29/00; B24B 29/02; B24B 29/04
USPC ...................... 492/30, 31, 33, 34, 35, 36, 37
See application file for complete search history.

(56) References Cited

U.S. PATENT DOCUMENTS

| | | | | | |
|---|---|---|---|---|---|
| 4,065,841 | A | * | 1/1978 | Gysin | B41N 7/04 101/148 |
| 5,148,639 | A | * | 9/1992 | Sakai | G03G 5/005 399/350 |
| 5,445,588 | A | * | 8/1995 | Ishibashi | B41N 7/06 492/31 |
| 5,913,716 | A | * | 6/1999 | Mucci | B24B 35/00 451/168 |
| 5,975,993 | A | * | 11/1999 | Isoda | B24B 5/37 451/49 |
| 6,287,033 | B1 | * | 9/2001 | Hatakeyama | B41J 13/02 400/636 |
| 7,962,077 | B2 | * | 6/2011 | Jansen | C09D 175/06 399/265 |

(Continued)

FOREIGN PATENT DOCUMENTS

| | | |
|---|---|---|
| JP | 9-211964 A | 8/1997 |
| JP | 2004-341511 A | 12/2004 |

(Continued)

*Primary Examiner* — Jason L Vaughan
(74) *Attorney, Agent, or Firm* — Birch, Stewart, Kolasch & Birch, LLP

(57) ABSTRACT

An inventive semiconductive roller includes a tubular semiconductive rubber layer (2) rotatable in a rotation direction, the semiconductive rubber layer having a multiplicity of minute projections (6) provided in circumferentially and axially discrete relation on an outer peripheral surface (5) thereof, the minute projections each having an apex (7) located forward (F) in the rotation direction and two edges (8,8) extending from the apex rearward (R) in the rotation direction obliquely with respect to the rotation direction so that the projections are each flared with a width (w) thereof progressively increasing in a rearward direction (R) from the apex (7) as measured axially of the semiconductive roller.

5 Claims, 2 Drawing Sheets

(56) References Cited

U.S. PATENT DOCUMENTS

| | | | |
|---|---|---|---|
| 7,965,965 B2* | 6/2011 | Maeda | G03G 15/0818 399/119 |
| 8,192,339 B2* | 6/2012 | Suzuki | G03G 15/0818 492/28 |
| 8,948,646 B2* | 2/2015 | Miyake | G03G 15/0233 399/100 |
| 8,973,267 B2* | 3/2015 | Gelli | B23C 3/32 29/895.3 |
| 9,280,078 B2* | 3/2016 | Higaki | G03G 15/0233 |
| 2006/0183615 A1* | 8/2006 | Eun | G03G 15/0233 492/56 |
| 2007/0110484 A1* | 5/2007 | Yamada | G03G 15/0818 399/286 |
| 2013/0217554 A1* | 8/2013 | Hanyu | B65G 39/00 492/33 |
| 2013/0288869 A1 | 10/2013 | Tajima | |
| 2014/0128233 A1* | 5/2014 | Furukawa | G03G 15/0233 492/18 |

FOREIGN PATENT DOCUMENTS

| | | |
|---|---|---|
| JP | 2006-64750 A | 3/2006 |
| JP | 2011-95725 A | 5/2011 |
| JP | 5086418 B2 | 11/2012 |
| JP | 2013-117678 A | 6/2013 |
| JP | 2013-231846 A | 11/2013 |

\* cited by examiner

AXIAL DIRECTION

AXIAL DIRECTION

SEMICONDUCTIVE ROLLER

TECHNICAL FIELD

The present invention relates to a semiconductive roller which is advantageously used particularly as a charging roller or the like in an electrophotographic image forming apparatus.

BACKGROUND ART

In an electrophotographic image forming apparatus such as a laser printer, an electrostatic copying machine, a plain paper facsimile machine or a printer-copier-facsimile multifunction machine, an image is generally formed on a surface of a sheet such as a paper sheet or a plastic film through the following process steps.

First, a surface of a photoreceptor body having photoelectric conductivity is evenly electrically charged and, in this state, exposed to light, whereby an electrostatic latent image corresponding to an image to be formed on the sheet is formed on the surface of the photoreceptor body (charging step and exposing step).

Then, toner (minute color particles) preliminarily electrically charged at a predetermined potential is brought into contact with the surface of the photoreceptor body. Thus, the toner selectively adheres to the surface of the photoreceptor body according to the potential pattern of the electrostatic latent image, whereby the electrostatic latent image is developed into a toner image (developing step).

Subsequently, the toner image is transferred onto the surface of the sheet (transfer step), and fixed to the surface of the sheet (fixing step). Thus, the image is formed on the surface of the sheet.

Further, a part of the toner remaining on the surface of the photoreceptor body after the transfer of the toner image is removed, for example by a cleaning blade (cleaning step). Thus, the photoreceptor body is ready for the next image formation.

In the charging step out of the aforementioned process steps, a charging roller is used, which is kept in contact with the surface of the photoreceptor body to evenly electrically charge the surface of the photoreceptor body.

Widely used as the charging roller is a semiconductive roller having an outer peripheral surface to be kept in contact with the surface of the photoreceptor body, at least the outer peripheral surface being made of a crosslinking product of a semiconductive rubber composition.

The semiconductive rubber composition for the semiconductive roller is generally prepared by blending a rubber component, including at least an ion conductive rubber such as an epichlorohydrin rubber, a crosslinking component for crosslinking the rubber component, and the like.

Minute particles such as of silica or titanium oxide are externally added to the toner for controlling the fluidity, the electrical chargeability and other physical properties of the toner.

However, the external additive particles and toner particle pieces resulting from pulverization of the toner particles during repeated image formation (hereinafter referred to generally as "external additive particles") cannot be completely removed from the surface of the photoreceptor body by the cleaning blade or the like and, therefore, the external additive particles left unremoved are gradually deposited on the outer peripheral surface of the charging roller constantly kept in contact with the surface of the photoreceptor body during the repeated image formation.

The deposited external additive particles are liable to influence the electrical chargeability and other physical properties of the photoreceptor body and adhere to a formed image, resulting in imaging failure.

Particularly, where the charging roller is produced by forming the semiconductive rubber composition into a tubular body, crosslinking the tubular body and dry-polishing an outer peripheral surface of the tubular body to a predetermined surface roughness, streaky polishing marks are formed axially on the outer peripheral, surface and, during the repeated image formation, the external additive particles are deposited linearly along the polishing marks. This results in imaging failure such as transverse streaking in a formed image (Patent Document 1 and the like).

It is noted that the invention disclosed in Patent Document 1 mainly relates to a developing roller, and minute polishing marks formed on the developing roller hardly influence the image formation and, therefore, cause no problem.

CITATION LIST

Patent Document

Patent Document 1: JP5086418

SUMMARY OF THE INVENTION

Problem to be Solved by the Invention

It is also contemplated that the dry-polished outer peripheral surface is further mirror-finished by a wet traverse polishing method or the like. In this case, however, streaky polishing marks are formed circumferentially on the outer peripheral surface and, during the repeated image formation, the external additive particles are deposited along the streaky polishing marks. This results an imaging failure such as longitudinal streaking in a formed image.

It is an object of the present invention to provide a semiconductive roller which is less liable to cause the imaging failure such as the transverse streaking or the longitudinal streaking which may otherwise occur due to the deposition of the external additive particles when the image formation is repeated with the use of the semiconductive roller as a charging roller.

Solution to Problem

The present invention provides a semiconductive roller, which includes at least one tubular semiconductive rubber layer made from a semiconductive rubber composition and circumferentially rotatable in one rotation direction, the semiconductive rubber layer having a multiplicity of minute projections provided in circumferentially and axially discrete relation on an outer peripheral surface thereof, the minute projections each having a surface shape which has an apex located forward in the rotation direction and two edges extending from the apex rearward in the rotation direction obliquely with respect to the rotation direction so that the projections are each flared with a width thereof progressively increasing in a rearward direction from the apex as measured axially of the semiconductive roller.

Effects of the Invention

According to the present invention, the projections are provided in the circumferentially and axially discrete relation on the outer peripheral surface as each having the specific flared surface shape and, as the semiconductive roller is rotated, the external additive particles are generally uniformly spread over the entire outer peripheral surface of the semiconductive roller along the flared projections and trapped in recesses defined between the projections. Therefore, the imaging failure such as the transverse streaking and the longitudinal streaking can be prevented which may otherwise occur due to the local deposition of the external additive particles during the repeated image formation.

EMBODIMENTS OF THE INVENTION

<<Semiconductive Roller>>

Figure 1A:
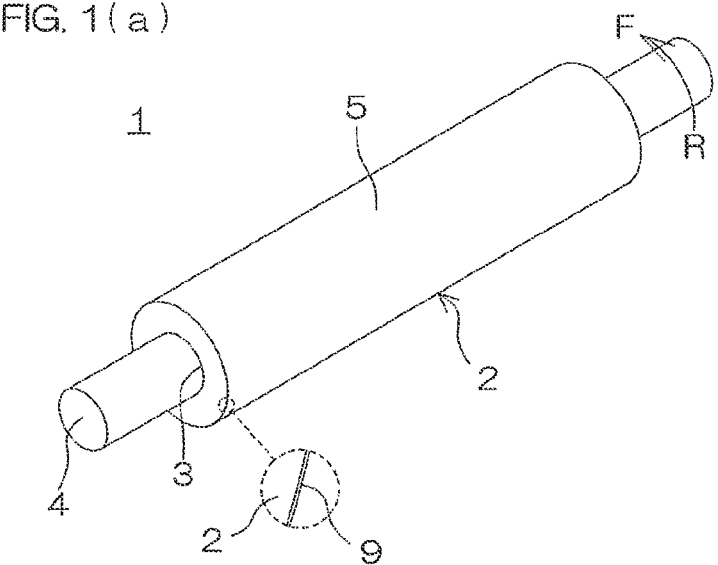
FIG. 1(a) is a perspective view illustrating an exemplary semiconductive roller according to the present invention.

Referring to FIG. 1(a), a semiconductive roller 1 according to one embodiment of the present invention includes a tubular semiconductive rubber layer 2 of a nonporous single-layer structure made from a semiconductive rubber composition. A shaft 4 is inserted through a center through-hole 3 of the tubular semiconductive rubber layer 2, and fixed to the center through-hole 3.

The shaft 4 is a unitary member made of a metal such as aluminum, an aluminum alloy or a stainless steel.

The shaft 4 is electrically connected to and mechanically fixed to the semiconductive rubber layer 2, for example, via an electrically conductive adhesive agent. Alternatively, a shaft having an outer diameter that is greater than the inner diameter of the through-hole 3 is used as the shaft 4, and press-inserted into the through-hole 3 to be electrically connected to and mechanically fixed to the semiconductive rubber layer 2. Thus, the shaft 4 and the semiconductive rubber layer 2 are unitarily rotatable.

Figure 3:
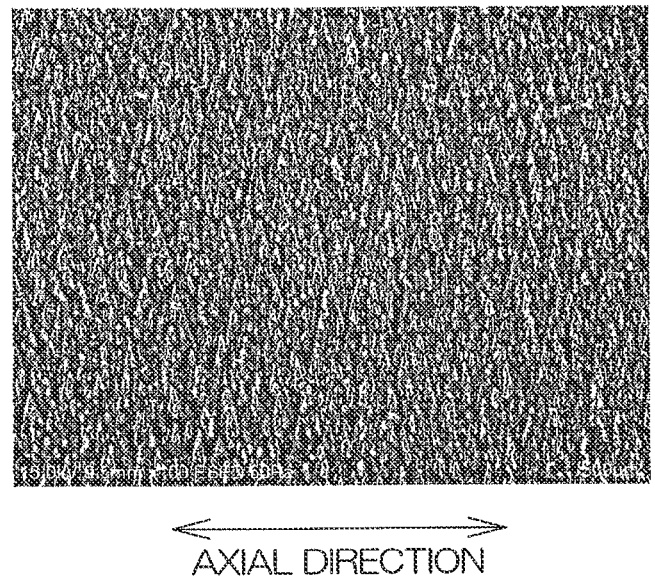
FIG. 3 is a microscopic photograph showing an outer peripheral surface of a semiconductive roller produced in Example 1 of the present invention on an enlarged scale.

Referring to FIG. 3, the semiconductive rubber layer 2 has a multiplicity of minute projections provided on the outer peripheral surface 5 thereof.

Figure 1B:
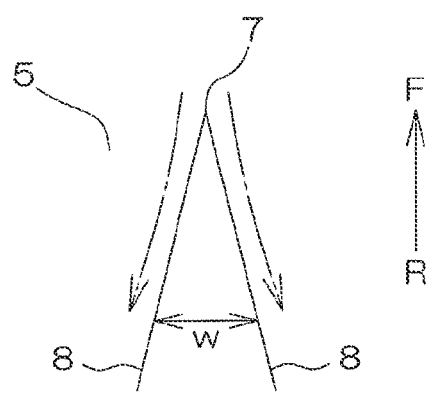
FIG. 1(b) is a plan view illustrating an exemplary projection provided on an outer peripheral surface of the semiconductive roller on an enlarged scale.

Referring to FIG. 1(b), the projections 6 each have a surface shape which has an apex 7 located forward (F) in a rotation direction of the semiconductive rubber layer 2 as indicated by a solid line arrow in FIGS. 1(a) and 1(b) and two edges 8, 8 extending from the apex 7 rearward (R) in the rotation direction obliquely with respect to the rotation direction so that the projections are each flared with a width w thereof progressively increasing in the rearward direction R from the apex 7 as measured axially of the semiconductive roller.

When the semiconductive roller 1 having the projections 6 provided in circumferentially and axially discrete relation and each having the aforementioned specific flared shape is used as a charging roller and rotated in the aforementioned rotation direction, external additive particles remaining on a surface of a photoreceptor body and transferred to the semiconductive roller 1 are laterally diverged on opposite sides of each of the projections 6 along the edges 8, 8 of the flared projections as indicated by one-dot-and-dash line arrows in FIG. 3(b). Then, the external additive particles are generally uniformly spread over the entire outer peripheral surface 5 of the semiconductive rubber layer 2, and trapped in recesses defined between the projections.

Thus, the imaging failure such as the transverse streaking and the longitudinal streaking can be prevented which may otherwise occur due to the local deposition of the external additive particles.

As shown in FIG. 1(a) on an enlarged scale, an oxide film 9 may be provided in the outer peripheral surface 5 of the semiconductive rubber layer 2.

The oxide film 9 thus provided functions as a dielectric layer to reduce the dielectric dissipation factor of the semiconductive roller 1. Where the semiconductive roller 1 is used as the charging roller, the oxide film 9 serves as a lower friction layer to suppress the adhesion of the external additive particles. This further reliably prevents the imaging failure such as the transverse streaking and the longitudinal streaking, which may otherwise occur due to the local deposition of the external additive particles.

In addition, the oxide film 9 can be easily formed by irradiation with ultraviolet radiation in an oxidizing atmosphere, thereby suppressing the reduction in the productivity of the semiconductive roller 1 and the increase in production costs. However, the oxide film 9 may be obviated.

The semiconductive roller 1 is produced by extruding the predetermined semiconductive rubber composition into a tubular body by means of an extruder, and crosslinking the tubular body in a vulcanization can by heat and pressure to form a semiconductive rubber layer 2.

The semiconductive rubber layer 2 this formed is heated in an oven for secondary crosslinking, then cooled, cut to a predetermined length, and polished to a predetermined outer diameter.

The shaft 4 may be inserted into and fixed to the hole 3 at any time between the end of the crosslinking and the end of the polishing.

However, the semiconductive rubber layer 2 is preferably secondarily crosslinked and polished with the shaft 4 inserted through the through-hole 3 after the crosslinking. This prevents warpage and deformation of the semiconductive rubber layer 2 which may otherwise occur due to expansion and contraction of the semiconductive rubber layer 2 during the secondary crosslinking. Further, the outer peripheral surface 5 of the semiconductive rubber layer 2 is polished with the semiconductive rubber layer 2 being rotated about the shaft 4. This improves the working efficiency in the polishing, and suppresses deflection of the outer peripheral surface 5.

As previously described, the shaft 4 having an outer diameter greater than the inner diameter of the through-hole 3 may be press-inserted into the through-hole 3, or the shaft 4 may be inserted through the through-hole 3 of the semiconductive rubber layer 2 with the intervention of the electrically conductive thermosetting adhesive agent before the secondary crosslinking.

In the latter case, the thermosetting adhesive agent is cured when the semiconductive rubber layer 2 is secondarily crosslinked by the heating in the oven. Thus, the shaft 4 is electrically connected to and mechanically fixed to the semiconductive rubber layer 2.

In the former case, the electrical connection and the mechanical fixing are achieved simultaneously with the press insertion.

In the polishing step, a conventional dry traverse polishing method is employed for the polishing of the semiconductive rubber layer 2 to roughly control the outer diameter and the surface geometry of the semiconductive rubber layer 2.

Then, the outer peripheral surface 5 of the semiconductive rubber layer 2 is polished by a so-called wet oscillation polishing method. Thus, a multiplicity of projections 6 each having the aforementioned specific surface shape are formed in circumferentially and axially discrete relation on the outer peripheral surface 5.

Figure 2:
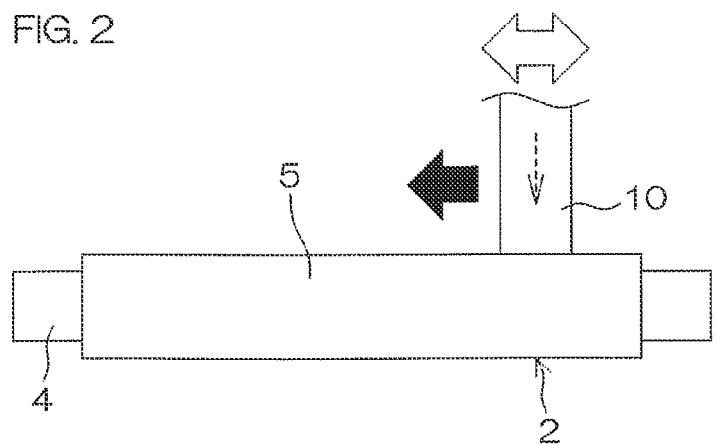
FIG. 2 is a diagram for explaining a process for forming projections on the outer peripheral surface of the exemplary semiconductive roller shown in FIG. 1.

Referring to FIG. 2, the semiconductive rubber layer 2 yet to be formed with the projections 6 is rotated in one direction, and a wet polishing liquid not shown is supplied to the semiconductive rubber layer 2. In this state, a water-resistant polishing paper 10, for example, supported from back by a backup roller is kept in contact with the outer peripheral surface 5 of the semiconductive rubber layer 2.

Then, the water-resistant polishing paper 10 kept in contact with the outer peripheral surface 5 is moved relatively along the entire axial length of the semiconductive rubber layer 2 as indicated by a black arrow in FIG. 2, while being reciprocally finely moved axially of the semiconductive rubber layer 2 as indicated by white arrows in FIG. 2. Thus, the outer peripheral surface 5 is wet-polished.

In this manner, the multiplicity of projections 6 each having the predetermined surface shape as described above are formed as polishing marks in circumferentially and axially discrete relation on the outer peripheral surface 5 of the semiconductive rubber layer 2.

The water-resistant polishing paper 10 to be used is, for example, an elongated polishing paper, which is preferably fed little by little longitudinally thereof as indicated by a broken line arrow in FIG. 2, so that a new surface portion of the polishing paper can be constantly used.

The water-resistant polishing paper 10 has an abrasive grain size of not less than 20 μm and not greater than 40 μm.

If the abrasive grain size is less than the aforementioned range, the projections 6 formed on the outer peripheral surface 5 of the semiconductive rubber layer 2 each have an insufficient projection height as measured from the recesses defined between the projections 6. Therefore, it will be impossible to sufficiently provide the effect of the provision of the projections 6 described above. That is, the recesses defined between the projections 6 are shallow, thereby failing to accommodate a sufficient amount of external additive particles. Therefore, external additive particles running out of the recesses during the repeated image formation cause the imaging failure.

If the abrasive grain size is greater than the aforementioned range, on the other hand, the projections 6 each have an excessively great projection height. As a result, the outer peripheral surface 5 has an excessively rough surface geometry, making it impossible to sufficiently electrically charge the surface of the photoreceptor body at the initial stage of the image formation process. Therefore, the imaging failure is liable to occur.

Where a water-resistant polishing paper having an abrasive grain size of not less than 20 μm and not greater than 40 μm is used, in contrast, it is possible to form a multiplicity of projections 6 each having a proper projection height on the outer peripheral surface 5 of the semiconductive rubber layer 2, so that proper image formation can be achieved at the initial stage of the image formation process. Even if the image formation is repeated, the semiconductive roller 1 is free from the imaging failure, which may otherwise occur due to the deposition of the external additive particles.

The projection height of each of the projections 6 to be formed on the outer peripheral surface 5 of the semiconductive rubber layer 2 is not particularly limited but, as apparent from the results for inventive examples and comparative examples to be described later, the outer peripheral surface 5 preferably has a ten-point average roughness $Rz1$ of not less than 5 μm and not greater than 10 μm and a ten-point average roughness $Rz2$ of not less than 4 μm and not greater than 6 μm as respectively measured axially and circumferentially of the semiconductive rubber layer 2 in conformity with Japanese Industrial Standards JIS $B0601_{-1994}$.

Where the axial ten-point average roughness $Rz1$ and the circumferential ten-point average roughness $Rz2$ are within the aforementioned ranges, the projection heights of the multiple projections 6 formed on the outer peripheral surface 5 of the semiconductive rubber layer can be each controlled within a proper range to ensure proper image formation at the initial stage of the image formation process. Even if the image formation is repeated, the semiconductive roller 1 is free from the imaging failure which may otherwise occur due to the deposition of the external additive particles.

In order to control the axial ten-point average roughness $Rz1$ and the circumferential ten-point, average roughness $Rz2$ in the aforementioned range, the abrasive grain size of the water-resistant polishing paper 10 to be used for the aforementioned wet oscillation polishing method may be controlled within the aforementioned range, or the conditions for the wet oscillation polishing method (e.g., the rotation speed of the semiconductive rubber layer 2, the press-in depth of the water-resistant polishing paper 10 with respect to the outer peripheral surface 5, the width and the speed of the fine reciprocal movement of the water-resistant polishing paper 10, and the axial feeding speed of the water-resistant polishing paper 10 with respect to the semiconductive rubber layer 2) may be controlled.

More specifically, for example, the rotation speed of the semiconductive rubber layer 2 is preferably not less than 1500 rpm and not greater than 3000 rpm. The press-in depth of the water-resistant polishing paper 10 with respect to the outer peripheral surface 5 is preferably 0.3 mm to 1.0 mm from the position of contact between the polishing paper 10 and the outer peripheral surface 5 to erase polishing marks formed by the dry polishing. The width of the reciprocal fine movement of the water-resistant polishing paper is preferably not less than 4 mm and not greater than 8 mm, and the speed of the reciprocal fine movement of the water-resistant polishing paper is preferably not less than 3000 mm/second and not greater than 5000 mm/second. The axial feeding speed (traverse speed) of the water-resistant polishing paper 10 with respect to the semiconductive rubber layer 2 is preferably not less than 100 mm/minute and not greater than 200 mm/minute.

Examples of the liquid to be used for the wet polishing include water, and a polishing liquid prepared by blending a water-soluble polishing agent with water. A preferred example of the backup roller is a urethane foam roller.

As described above, the formation of the oxide film 9 is preferably achieved by the irradiation of the outer peripheral surface 5 of the semiconductive rubber layer 2 with the ultraviolet radiation, because this method is simple and efficient. That is, the formation of the oxide film 9 is achieved by irradiating a part of the semiconductive rubber composition present in the outer peripheral surface 5 of the semiconductive rubber layer 2 with ultraviolet radiation having a predetermined wavelength for a predetermined period to oxidize the irradiated part of the semiconductive rubber composition.

Since the formation of the oxide film 9 is achieved through the oxidation of the part of the semiconductive rubber composition present in the outer peripheral surface 5 of the semiconductive rubber layer 2 by the irradiation with the ultraviolet radiation as described above, the resulting oxide film 9 is free from problems associated with a coating film formed in a conventional manner by applying a coating agent, and highly uniform in thickness and surface geometry.

The wavelength of the ultraviolet radiation to be used for the irradiation is preferably not less than 100 nm and not greater than 400 nm, particularly preferably not greater than 300 nm, for efficient oxidation of the semiconductive rubber composition and for the formation of the oxide film 9 excellent in the aforementioned functions. The irradiation period is preferably not shorter than 30 seconds and not longer than 30 minutes, particularly preferably not shorter than 1 minute and not longer than 15 minutes.

The formation of the oxide film 9 may be achieved by other method, or may be obviated in some case.

The semiconductive rubber layer 2 having the nonporous single-layer structure preferably has a Shore-A hardness of not greater than 60°, particularly preferably not greater than 55°.

If the Shore-A hardness is greater than the aforementioned range, the semiconductive rubber layer 2 has an insufficient flexibility, thereby failing to efficiently electrically charge the photoreceptor body with a sufficient nip width. Further, the semiconductive rubber layer 2 may damage the surface of the photoreceptor body.

In the present invention, the Shore-A hardness is expressed as a value determined at a temperature of 23° C. in conformity with a measurement method specified by Japanese Industrial Standards JIS K6253-3$_{-2012}$ by means of a micro rubber durometer MD-1 available from Kobunshi Keiki Co., Ltd.

The inventive semiconductive roller is not limited to the aforementioned single layer structure including the semiconductive rubber layer 2 (other than the oxide film 9), but may have a layered structure which includes two rubber layers including an outer layer provided on the side of the outer peripheral surface 5 and an inner layer provided on the side of the shaft 4.

The inventive semiconductive roller can be used not only as the charging roller but also as a developing roller, a transfer roller, a cleaning roller or the like, for example, in an electrophotographic image forming apparatus such as a laser printer, an electrostatic copying machine, a plain paper facsimile machine or a printer-copier-facsimile multifunction machine.

<<Semiconductive Rubber Composition>>

Any of various rubber compositions capable of imparting the semiconductive roller 1 with a semiconductivity of not greater than about $10^8 \Omega$ is usable as the semiconductive rubber composition for the semiconductive rubber layer 2

Particularly, the semiconductive rubber composition preferably contains an ion conductive rubber such as an epichlorohydrin rubber to be thereby imparted with ion conductivity.

The semiconductive rubber composition is prepared, for example, by blending a rubber component including the epichlorohydrin rubber and an additional rubber in combination, an ion conductive agent, and a crosslinking component for crosslinking the rubber component in predetermined proportions.

<Epichlorohydrin Rubber>

Examples of the epichlorohydrin rubber for the rubber component include epichlorohydrin homopolymers, epichlorohydrin-ethylene oxide bipolymers (ECO), epichlorohydrin-propylene oxide bipolymers, epichlorohydrin-allyl glycidyl ether bipolymers, epichlorohydrin-ethylene oxide-allyl glycidyl ether terpolymers (GECO) epichlorohydrin-propylene oxide-allyl glycidyl ether terpolymers and epichlorohydrin-ethylene oxide-propylene oxide-allyl glycidyl ether quaterpolymers, which may be used either alone or in combination.

Of these epichlorohydrin rubbers, the ethylene oxide-containing copolymers, particularly the ECO and/or the GECO are preferred.

These copolymers preferably each have an ethylene oxide content of not less than 30 mol % and not greater than 80 mol %, particularly preferably not less than 50 mol %.

Ethylene oxide functions to reduce the roller resistance of the entire semiconductive rubber layer. If the ethylene oxide content is less than the aforementioned range, however, it will be impossible to sufficiently provide this function and hence to sufficiently reduce the roller resistance.

If the ethylene oxide content is greater than the aforementioned range, on the other hand, ethylene oxide is liable to be crystallized, whereby the segment motion of molecular chains is hindered to adversely increase the roller resistance. Further, the semiconductive rubber layer is liable to have a higher hardness after the crosslinking, and the semiconductive rubber composition is liable to have a higher viscosity when being heat-melted before the crosslinking. Therefore, the processability is liable to be reduced.

The ECO has an epichlorohydrin content that is a balance obtained by subtracting the ethylene oxide content from the total. That is, the epichlorohydrin content is preferably not less than 20 mol % and not greater than 70 mol %, particularly preferably not greater than 50 mol %.

The GECO preferably has an allyl glycidyl ether content of not less than 0.5 mol % and not greater than 10 mol %, particularly preferably not less than 2 mol % and not greater than 5 mol %.

Allyl glycidyl ether per se functions as side chains of the copolymer to provide a free volume, whereby the crystallization or ethylene oxide is suppressed to reduce the roller resistance of the semiconductive roller. However, if the allyl glycidyl ether content is less than the aforementioned range, it will be impossible to provide this function and hence to sufficiently reduce the roller resistance.

Allyl glycidyl ether also functions as crosslinking sites during the crosslinking of the GECO. Therefore, if the allyl glycidyl ether content is greater than the aforementioned range, the crosslinking density of the GECO is increased, whereby the segment motion of molecular chains is hindered. This may adversely increase the roller resistance.

The GECO has an epichlorohydrin content that is a balance obtained by subtracting the ethylene oxide content and the allyl glycidyl ether content from the total. That is, the epichlorohydrin content is preferably not less than 10 mol % and not greater than 69.3 mol %, particularly preferably not less than 19.5 mol % and not greater than 60 mol %.

Examples of the GECO include copolymers of the three comonomers described above in a narrow sense, as well as known modification products obtained by modifying an epichlorohydrin-ethylene oxide copolymer (ECO) with allyl glycidyl ether. In the present invention, any of these modification products may be used as the GECO.

The proportion of the epichlorohydrin rubber to be blended is preferably not less than 40 parts by mass and not greater than 80 parts by mass, particularly preferably nor less than 50 parts by mass and not greater than 70 parts by mass, based on 100 parts by mass of the overall rubber component.

<Additional Rubber>

The additional rubber is at least one selected from the group consisting of a styrene butadiene rubber (SER), a chloroprene rubber (CR), an acrylonitrile butadiene rubber (NBR), a butadiene rubber (BR), an acryl rubber (ACM) and an EPDM, for example.

(SBR)

Usable as the SER are various SBRs synthesized by copolymerizing styrene and 1,3-butadiene by an emulsion polymerization method, a solution polymerization method and other various polymerization methods. The SBRs include those of an oil-extension type having flexibility controlled by addition of an extension oil, and those of a non-oil-extension type containing no extension oil. Either type of SBRs is usable.

According to the styrene content, the SBRs are classified, into a higher styrene content type, an intermediate styrene content type and a lower styrene content type, and any of these types of SBRs is usable.

These SBRs may be used either alone or in combination.

(CR)

The CR is synthesized, for example, by polymerizing chloroprene by an emulsion polymerization method. The CR is classified in a sulfur modification type or a non-sulfur-modification type depending on the type of a molecular weight adjusting agent to be used for the emulsion polymerization. Either type of CRs is usable in the present invention.

The sulfur modification type CR is prepared by plasticizing a copolymer of chloroprene and sulfur (molecular weight adjusting agent) with thiuram disulfide or the like to adjust the viscosity of the copolymer to a predetermined viscosity level.

The non-sulfur-modification type CR is classified, for example, in a mercaptan modification type, a xanthogen modification type or the like.

The mercaptan modification type CR is synthesized in substantially the same manner as the sulfur modification type CR, except that an alkyl mercaptan such as n-dodecyl mercaptan, tert-dodecyl mercaptan or octyl mercaptan, for example, is used as the molecular weight adjusting agent. The xanthogen modification type CR is synthesized in substantially the same manner as the sulfur modification type CR, except that an alkyl xanthogen compound is used as the molecular weight adjusting agent.

Further, the CR is classified in a lower crystallization speed type, an intermediate crystallization speed type or a higher crystallization speed type depending on the crystallization speed.

In the present invention, any of these types of CRs may be used. Particularly, CRs of the non-sulfur-modification type and the lower crystallization speed type are preferably used either alone or in combination.

Further, a rubber of a copolymer of chloroprene and other comonomer may be used as the CR.

Examples of the other comonomer include 2,3-dichloro-1,3-butadiene, 1-chloro-1,3-butadiene, styrene, acrylonitrile, methacrylonitrile, isoprene, butadiene, acrylic acid, acrylates, methacrylic acid and methacrylates, which may be used either alone or in combination.

(NBR)

The NBR is classified in a lower acrylonitrile content type, an intermediate acrylonitrile content type, an intermediate to higher acrylonitrile content type, a higher acrylonitrile content type or a very high acrylonitrile content type depending on the acrylonitrile content. Any of these types of NBRs is usable.

The NBRs include those of an oil-extension type having flexibility controlled by addition of an extension oil, and those of a non-oil-extension type containing no extension oil. Either type of NBRs is usable.

These NBRs may be used either alone or in combination.

(BR)

Usable as the BR are various crosslinkable BRs.

Particularly, a higher cis-content BR having a cis-1,4 bond content of not less than 95% and having excellent lower-temperature characteristic properties and a lower hardness and hence a higher flexibility in a lower temperature and lower humidity environment is preferred.

The BRs include those of an oil-extension type having flexibility controlled by addition of an extension oil, and those of a non-oil-extension type containing no extension oil. Either type of BRs is usable.

These BRs may be used either alone or in combination.

(ACM)

Usable as the ACM are various ACMs each synthesized by copolymerizing an alkyl acrylate such as ethyl acrylate or butyl acrylate as a major component with acrylonitrile, a halogen-containing monomer such as 2-chloroethyl vinyl ether, or glycidyl acrylate, allyl glycidyl ether, ethylidene norbornene or the like.

These ACMs may be used either alone or in combination.

(EPDM)

Usable as the EPDM are various EPDMs each prepared by introducing double bonds into a main chain thereof by employing a small amount of a third ingredient (diene) in addition to ethylene and propylene. A variety of EPDM products containing different types of third ingredients in different amounts are commercially available. Typical examples of the third ingredients include ethylidene norbornene (ENB), 1,4-hexadiene (1,4-HD) and dicyclopentadiene (DCP). A Ziegler catalyst is typically used as a polymerization catalyst.

The EPDMs include those of an oil-extension type having flexibility controlled by addition of an extension oil, and those of a non-oil-extension type containing no extension oil. Either type of EPDMs is usable.

These EPDMs may be used either alone or in combination.

<Ion Conductive Agent>

A salt of an anion having a fluoro group and a sulfonyl group in its molecule (hereinafter sometimes referred to simply as "ionic salt"), for example, is Used as the ion conductive agent.

Examples of the anion having the fluoro group and the sulfonyl group in its molecule for the ionic salt include fluoroalkyl sulfonate ions, bis(fluoroalkylsulfonyl)imide ions, tris(fluoroalkylsulfonyl)methide ions, which may be used either alone or in combination.

Examples of the fluoroalkyl sulfonate ions include $CF_3SO_3-$ and $C_4F_9SO_3-$, which may be used either alone or in combination.

Examples of the bis(fluoroalkylsulfonyl)imide ions include $(CF_3SO_2)_2N-$, $(C_2F_5SO_2)_2N-$, $(C_4F_9SO_2)(CF_3SO_2)N-$, $(FSO_2C_6F_4)(CF_3SO_2)N-$, $(C_8F_{17}SO_2)$ (CF$_3$SO$_2$)N—, (CF$_3$CH$_2$OSO$_2$)$_2$N—, (CF$_3$CF$_2$CH$_2$OSO$_2$)$_2$N—, (HCF$_2$CF$_2$CH$_2$OSO$_2$)$_2$N— and [(CF$_3$)$_2$CHOSO$_2$]$_2$N—, which may be used either alone or in combination.

Examples of the tris(fluoroalkylsulfonyl)methide ions include (CF$_3$SO$_2$)$_3$C— and (CF$_3$CH$_2$OSO$_2$)$_3$C—, which may be used either alone or in combination.

Specific examples of a cation which forms the ionic salt together with the anion include cations of alkali metals such as sodium, lithium and potassium, cations of Group II elements such as beryllium, magnesium, calcium, strontium and barium, cations of transition elements, cations of amphoteric elements, quaternary ammonium cations represented by the following formula (1) and cations represented by the following formula (2), which may be used either alone or in combination:

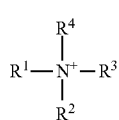

(1)

wherein R$^1$ to R$^4$, which may be the same or different, are each a C1 to C20 alkyl group or a derivative of the alkyl group.

Particularly, a quaternary ammonium cation of a trimethyl type represented by the formula (1) in which three of R$^1$ to R$^4$ are methyl groups and the other of R$^1$ to R$^4$ is a C4 to C20 alkyl group, more preferably a C6 to C20 alkyl group, or its derivative is preferred.

A positive charge on a nitrogen atom of the cation is stabilized by the three methyl groups which are strong electron donating groups, and the compatibility of the ionic salt with the rubber component is improved by the other alkyl group or its derivative. This stabilizes the positive charge on the nitrogen atom to increase the stability of the cation, thereby providing an ionic salt having a higher dissociation degree and a higher electrical conductivity imparting capability.

(2)

wherein R$^5$ and R$^6$, which may be the same or different, are each a C1 to C20 alkyl group or its derivative.

Particularly, R$^5$ and R$^6$ are each preferably a methyl group or an ethyl group which has an electron donating property and therefore is capable of easily stabilizing the positive charge on the nitrogen atom. This increases the stability of the cation to provide an ionic salt having a higher dissociation degree and a higher electrical conductivity imparting capability.

Particularly preferred as the ionic salt is a lithium salt including a lithium ion as the cation or a potassium salt including a potassium ion as the cation.

Particularly preferred examples of the ionic salt include (CF$_3$SO$_2$)$_2$NLi (lithium bis(trifluoromethanesulfonyl)imide) and (CF$_3$SO$_2$)$_2$NK (potassium bis(trifluoromethanesulfonyl)imide).

The proportion of the ionic salt to be blended is preferably not less than 0.05 parts by mass and not greater than 5 parts by mass based on 100 parts by mass of the overall rubber component.

<Crosslinking Component>

The crosslinking component includes a crosslinking agent, an accelerating agent and an acceleration assisting agent.

Examples of the crosslinking agent include a sulfur crosslinking agent, a thiourea crosslinking agent, a triazine derivative crosslinking agent, a peroxide crosslinking agent and monomers, which may be used either alone or in combination.

Examples of the sulfur crosslinking agent include sulfur such as sulfur powder and organic sulfur-containing compounds. Examples of the organic sulfur-containing compounds include tetramethylthiuram disulfide and N,N-dithiobismorpholine.

Examples of the thiourea crosslinking agent include tetramethylthiourea, trimethylthiourea, ethylene thiourea, and thioureas represented by (C$_n$H$_{2n+1}$NH)$_2$C=S (wherein n is an integer of 1 to 10), which may be used either alone or in combination.

Examples of the peroxide crosslinking agent include benzoyl peroxide and the like.

The sulfur and the thiourea crosslinking agent are preferably used in combination as the crosslinking agent.

The proportion of the sulfur to be used in combination with the thiourea crosslinking agent is preferably not less than 0.2 parts by mass and not greater than 3 parts by mass, particularly preferably not less than 0.5 parts by mass and not greater than 2 parts by mass, based on 100 parts by mass of the overall rubber component.

The proportion of the thiourea crosslinking agent to be blended is preferably not less than 0.2 parts by mass and not greater than 3 parts by mass, particularly preferably not less than 0.5 parts by mass and not greater than 1 part by mass, based on 100 parts by mass of the overall rubber component.

Examples of the accelerating agent include inorganic accelerating agents such as lime, magnesia (MgO) and litharge (PbO), and organic accelerating agents, which may be used either alone or in combination.

Examples of the organic accelerating agents include: guanidine accelerating agents such as 1,3-di-o-tolylguanidine, 1,3-diphenylguanidine, 1-o-tolylbiguanide and a di-o-tolylguanidine salt of dicatechol borate; thiazole accelerating agents such as 2-mercaptobenzothiazole and di-2-benzothiazyl disulfide; sulfenamide accelerating agents such as N-cyclohexyl-2-benzothiazylsulfenamide; thiuram accelerating agents such as tetramethylthiuram monosulfide, tetramethylthiuram disulfide, tetraethylthiuram disulfide and dipentamethylenethiuram tetrasulfide; and thiourea accelerating agents, which may be used either alone or in combination.

Different types of accelerating agents have different functions and, therefore, are preferably used in combination.

The proportion of the accelerating agent to be blended may be properly determined depending on the type of the accelerating agent, but is preferably not less than 0.1 part by mass and not greater than 5 parts by mass, particularly preferably not less than 0.2 parts by mass and not greater than 2 parts by mass, based on 100 parts by mass of the overall rubber component.

Examples of the acceleration assisting agent include metal compounds such as zinc white; fatty acids such as stearic acid, oleic acid and cotton seed fatty acids; and other conventionally known acceleration assisting agents, which may be used either alone or in combination.

The proportion of the acceleration assisting agent to be blended is preferably not less than 0.1 part by mass and not greater than 7 parts by mass, particularly preferably not less than 0.5 parts by mass and not greater than 5 parts by mass, based on 100 parts by mass of the overall rubber component.

<Other Ingredients>

As required, various additives may be added to the semiconductive rubber composition. Examples of the additives include an acid accepting agent, plasticizing agent, a processing aid, a degradation preventing agent, a filler, an anti-scorching agent, a lubricant, a pigment, an anti-static agent, a flame retarder, a neutralizing agent, a nucleating agent, a co-crosslinking agent and the like.

In the presence of the acid accepting agent, chlorine-containing gases generated from the epichlorohydrin rubber and the CR during the crosslinking of the rubber component are prevented from remaining in the semiconductive rubber layer. Thus, the acid accepting agent functions to prevent the inhibition of the crosslinking and the contamination of the photoreceptor body, which may otherwise be caused by the chlorine-containing gases.

Any of various substances serving as acid acceptors may be used as the acid accepting agent. Preferred examples of the acid accepting agent include hydrotalcites and Magsarat which are excellent in dispersibility. Particularly, the hydrotalcites are preferred.

Were the hydrotalcites are used in combination with magnesium oxide or potassium oxide, a higher acid accepting effect can be provided, thereby more reliably preventing the contamination of the photoreceptor body.

The proportion of the acid accepting agent to be blended is preferably not less than 0.5 parts by mass and not greater than 6 parts by mass, particularly preferably not less than 1 part by mass and not greater than 4 parts by mass, based on 100 parts by mass of the overall rubber component.

Examples of the plasticizing agent include plasticizers such as dibutyl phthalate (DBP), dioctyl phthalate (DOP) and tricresyl phosphate, and waxes such as polar waxes. Examples of the processing aid include fatty acids such as stearic acid.

The proportion of the plasticizing agent and/or the processing aid to be blended is preferably not greater than 5 parts by mass based on 100 parts by mass of the overall rubber component. This prevents the contamination of the photoreceptor body, for example, when the semiconductive roller is mounted in the image forming apparatus or when the image forming apparatus is operated. For this purpose, it is particularly preferred to use any of the polar waxes out of the plasticizing agent.

Examples of the degradation preventing agent include various anti-aging agents and anti-oxidants.

The anti-oxidants serve to reduce the environmental dependence of the roller resistance of the semiconductive roller and to suppress the increase in roller resistance during continuous energization of the semiconductive roller. Examples of the anti-oxidants include nickel diethylthiocarbamate (NOCRAC (registered trade name) NEC-P available from Ouchi Shinko Chemical Industrial Co., Ltd.) and nickel dibutyldithiocarbamate (NOCRAC NBC available from Ouchi Shinko Chemical Industrial Co., Ltd.

Examples of the filler include zinc oxide, silica, carbon, carbon black, clay, talc, calcium carbonate, magnesium carbonate and aluminum hydroxide, which may be used either alone or in combination.

The mechanical strength and the like of the semiconductive rubber layer can be improved by blending the filler.

The proportion of the filler to be blended is preferably not less than 5 parts by mass and not greater than 25 parts by mass, particularly preferably not greater than 20 parts by mass, based on 100 parts by mass of the overall rubber component.

An electrically conductive filler such as electrically conductive carbon black may be blended as the filler to impart the semiconductive rubber layer with electron conductivity.

A preferred example of the electrically conductive carbon black is HAF. The HAF can be evenly dispersed in the semiconductive rubber composition, thereby imparting the semiconductive rubber layer with more uniform electron conductivity.

The proportion of the electrically conductive carbon black to be blended is preferably not less than 1 part by mass and not greater than 8 parts by mass, particularly preferably not less than 3 parts by mass and not greater than 6 parts by mass, based on 100 parts by mass of the overall rubber component.

Examples of the anti-scorching agent include N-cyclohexylthiophthalimide, phthalic anhydride, N-nitrosodiphenylamine and 2,4-diphenyl-4-metyl-1-pentene, which may be used either alone or in combination. Particularly, N-cyclohexylthiophthalimide is preferred.

The proportion of the anti-scorching agent to be blended is preferably not less than 0.1 part by mass and not greater than 5 parts by mass, particularly preferably not greater than 1 part by mass, based on 100 parts by mass of the overall rubber component.

The co-crosslinking agent serves to crosslink itself as well as the rubber component to increase the overall molecular weight.

Examples of the co-crosslinking agent include ethylenically unsaturated monomers typified by methacrylic esters, metal salts of methacrylic acid and acrylic acid, polyfunctional polymers utilizing functional groups of 1,2-polybutadienes, and dioximes, which may be used either alone or in combination.

Examples of the ethylenically unsaturated monomers include:
(a) monocarboxylic acids such as acrylic acid, methacrylic acid and crotonic acid;
(b) dicarboxylic acids such as maleic acid, fumaric acid and itaconic acid;
(c) esters and anhydrides of the unsaturated carboxylic acids (a) and (b);
(d) metal salts of the monomers (a) to (c);
(e) aliphatic conjugated dienes such as 1,3-butadiene, isoprene and 2-chloro-1,3-butadiene;
(f) aromatic vinyl compounds such as styrene, α-methylstyrene, vinyltoluene, ethylvinylbenzene and divinylbenzene;
(g) vinyl compounds such as triallyl isocyanurate, triallyl cyanurate and vinylpyridine each having a hetero ring; and
(h) cyanovinyl compounds such as (meth)acrylonitrile and α-chloroacrylonitrile, acrolein, formyl sterol, vinyl methyl ketone, vinyl ethyl ketone and vinyl butyl ketone. These ethylenically unsaturated monomers may be used either alone or in combination.

Monocarboxylic acid esters are preferred as the esters (c) of the unsaturated carboxylic acids.

Specific examples of the monocarboxylic acid esters include:
alkyl(meth)acrylates such as methyl(meth)acrylate, ethyl (meth)acrylate, n-propyl(meth)acrylate, i-propyl(meth)acrylate, n-butyl(meth)acrylate, i-butyl(meth)acrylate, n-pentyl (meth)acrylate, i-pentyl(meth)acrylate, n-hexyl(meth) acrylate, cyclohexyl(meth)acrylate, 2-ethylhexyl(meth)

acrylate, octyl(meth)acrylate, i-nonyl(meth)acrylate, tert-butylcyclohexyl(meth)acrylate, decyl(meth)acrylate, dodecyl(meth)acrylate, hydroxymethyl(meth)acrylate and hydroxyethyl(meth)acrylate;

aminoalkyl(meth)acrylates such as aminoethyl(meth)acrylate, dimethyl amino ethyl(meth)acrylate and butylaminoethyl(meth)acrylate;

(meth)acrylates such as benzyl(meth)acrylate, benzoyl (meth)acrylate and aryl(meth)acrylates each having an aromatic ring;

(meth)acrylates such as glycidyl(meth)acrylate, methaglycidyl(meth)acrylate and epoxycyclohexyl(meth)acrylate each having an epoxy group;

(meth)acrylates such as N-methylol(meth)acrylamide, γ-(meth)acryloxypropyltrimethoxysilane and tetrahydrofurfuryl methacrylate each having a functional group; and polyfunctional (meth)acrylates such as ethylene glycol di(meth)acrylate, trimethylolpropane tri(meth)acrylate, ethylene dimethacrylate (EDMA), polyethylene glycol dimethacrylate and isobutylene ethylene dimethacrylate. These monocarboxylic acid esters may be used either alone or in combination.

The semiconductive rubber composition containing the ingredients described above can be prepared in a conventional manner. First, the rubbers for the rubber component are blended in the predetermined proportions, and the resulting rubber component is simply kneaded. After the ionic salt and additives other than the crosslinking component are added to and kneaded with the rubber component, the crosslinking component is finally added to and further kneaded with the resulting mixture. Thus, the semiconductive rubber composition is provided. A kneader, a Banbury mixer, an extruder or the like, for example, is usable for the kneading.

EXAMPLES

Example 1

(Preparation of Semiconductive Rubber Composition)

A rubber component was prepared by blending 60 parts by mass of an 500 (EPICHLOMER (registered trade name) D available from Daiso Co., Ltd. and having an ethylene oxide content of 61 mol %), 30 parts by mass of an NBR (lower acrylonitrile content NBR JSR N250 SL available from JSR Co., Ltd. and having an acrylonitrale content of 20%) and 10 parts by mass of a CR (SHOPRENE (registered trade name) WRT available from Showa Denko K.K.) The proportion of the 500 was 60 parts by mass based on 100 parts by mass of the overall rubber component.

While 100 parts by mass of the rubber component was simply kneaded by means of a 9 L kneader, 1 part by mass of potassium bis(trifluoromethanesulfonyl)imide (K-TFSI EF-N112 available from Mitsubishi Materials Electronic Chemicals Co., Ltd.) and ingredients shown below in Table 1 were added to and kneaded with the rubber component. Thus, a semiconductive rubber composition was prepared.

TABLE 1

| Ingredients | Parts by mass |
| --- | --- |
| Sulfur powder | 1.50 |
| Thiourea crosslinking agent | 0.60 |
| Accelerating agent DM | 1.50 |
| Accelerating agent TS | 0.50 |
| Accelerating agent DT | 0.54 |

TABLE 1-continued

| Ingredients | Parts by mass |
| --- | --- |
| Zinc oxide type-2 | 5.00 |
| Acid accepting agent | 5.00 |

The ingredients shown in Table 1 are as follows. The amounts (parts by mass) shown in Table 1 are based on 100 parts by mass of the overall rubber component. Sulfur powder: Crosslinking agent (available from Tsurumi Chemical Industry Co., Ltd.)

Thiourea crosslinking agent: Ethylene thiourea (2-mercaptoimidazoline ACCEL (registered trade name) 22-S available from Kawaguchi Chemical Industry Co., Ltd.

Accelerating agent DM: Di-2-benzothiazolyl disulfide (thiazole accelerating agent NOCCELER (registered trade name) DM available from Ouchi Shinko Chemical Industrial Co., Ltd.)

Accelerating agent TS: Tetramethylthiuram monosulfide (thiuram accelerating agent NOCCELER TS available from Ouchi Shinko Chemical Industrial Co., Ltd.)

Accelerating agent DT: 1,3-di-o-tolylguanidine (guanidine accelerating agent NOCCELER DT available from Ouchi Shinko Chemical Industrial Co., Ltd.

Zinc oxide type-2: Acceleration assisting agent (available form Mitsui Mining & Smelting Co., Ltd.

Acid accepting agent: Hydrotalcites (DHT-4A (registered trade name) 2 available from Kyowa Chemical Industry Co., Ltd.

(Production of Semiconductive Roller)

The semiconductive rubber composition thus prepared was fed into a 60-mm diameter extruder, and extruded into a tubular body having an outer diameter of 13.0 mm and an inner diameter of 5.5 mm. Then, the tubular body was fitted around a temporary crosslinking shaft, and crosslinked in a vulcanization can at 160° C. for 30 minutes. Thus, a semiconductive rubber layer was formed.

Then, the semiconductive rubber layer thus formed was removed from the temporary shaft, then fitted around a shaft having an outer diameter of 6 mm and an outer peripheral surface to which an electrically conductive thermosetting adhesive agent (polyamide adhesive agent) was applied, and heated in an oven at 150° C. for 60 minutes. Thus, the semiconductive rubber layer was bonded to the shaft. In turn, opposite end portions of the semiconductive rubber layer were cut, and the outer peripheral surface of the resulting semiconductive rubber layer was dry-polished to an outer diameter of 12.0 mm by means of a wide polishing machine.

While the resulting semiconductive rubber layer was rotated about the shaft at 2500 rpm in one direction and a polishing liquid is continuously supplied to the semiconductive rubber layer, an elongated water-resistant polishing paper having an abrasive grain size of 40 μm was supported from back by a backup roller and longitudinally fed to be brought into contact with the outer peripheral surface of the semiconductive rubber layer.

The press-in depth of the water-resistant polishing paper with respect to the outer peripheral surface was 0.3 to 1.0 mm as measured from the position of the contact between the water-resistant polishing paper and the outer peripheral surface to erase polishing marks formed by the dry polishing. The feeding speed of the water-resistant polishing paper was 10 mm/minute.

A solution prepared by adding 1 mass % of a polishing agent (YUSHIROKEN (registered trade name) SC-525 available from Yushiro Chemical Industry Co., Ltd.) in distilled water was used as the polishing liquid.

A urethane roller having an Asker-A hardness of 30° was use as the backup roller.

The water-resistant polishing paper kept in contact with the outer peripheral surface was relatively moved along the entire axial length of the semiconductive rubber layer, while being reciprocally finely moved axially of the semiconductive rubber layer.

The width of the reciprocal fine movement was 6 mm, and the speed of the reciprocal fine movement was 4000 mm/second. The feeding speed (traverse speed) of the water-resistant polishing paper to be fed axially of the semiconductive rubber layer was 150 mm/minute.

After the polished outer peripheral surface was wiped with alcohol, the semiconductive rubber layer was set in a UV treatment apparatus with its outer peripheral surface spaced 50 mm from a UV light source. The semiconductive rubber layer was irradiated with ultraviolet radiation for 15 minutes while being rotated at 30 rpm. Thus, an oxide film was formed in the outer peripheral surface of the semiconductive rubber layer, whereby a semiconductive roller was produced.

A microscopic photograph of the outer peripheral surface of the semiconductive rubber layer of the semiconductive roller of Example 1 thus produced is shown in FIG. 3.

As shown in FIG. 3, the semiconductive roller of Example 1 had a multiplicity of minute projections provided on the outer peripheral surface of the semiconductive rubber layer thereof, and the minute projections each had a surface shape having an apex located on one of opposite sides with respect to the direction of the rotation of the semiconductive rubber layer (on an upper side in FIG. 3) and two edges extending from the apex toward the other side (downward in FIG. 3) in the rotation direction obliquely with respect to the rotation direction so that the projections were each flared with a width thereof progressively increasing toward the other side from the apex as measured axially of the semiconductive roller.

Comparative Example 1

A semiconductive roller was produced in substantially the same manner as in Example 1, except that the outer peripheral surface of the semiconductive rubber layer was dry-polished and then an oxide film was formed in the outer peripheral surface without performing the wet oscillation polishing.

Comparative Example 2

A semiconductive roller was produced in substantially the same manner as in Example 1, except that the outer peripheral surface of the semiconductive rubber layer was dry-polished and further polished by an ordinary wet traverse polishing method without the reciprocal fine movement of the water-resistant polishing paper along the axis of the semiconductive rubber layer, and then an oxide film was formed in the outer peripheral surface.

Figure 4:
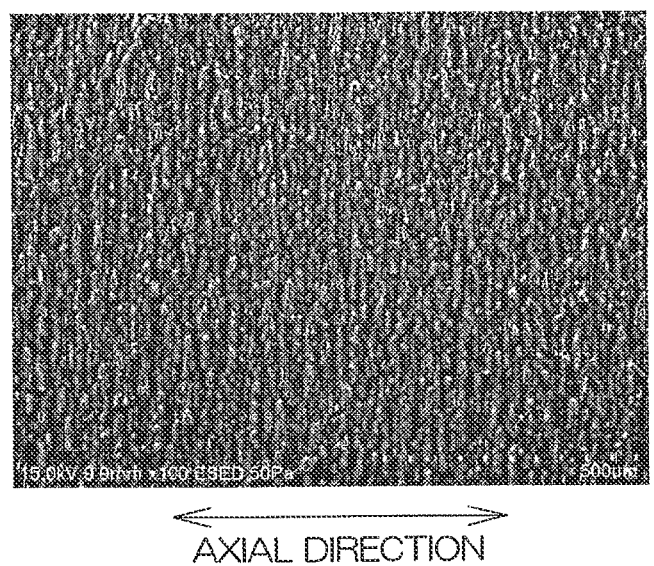
FIG. 4 is a microscopic photograph showing an outer peripheral surface of a semiconductive roller produced in Comparative Example 2 on an enlarged scale.

A microscopic photograph of the outer peripheral surface of the semiconductive rubber layer of the semiconductive roller of Comparative Example 2 thus produced is shown in FIG. 4.

As shown in FIG. 4, the semiconductive roller of Comparative Example 2 did not have the projections each having the surface shape of Example 1 on the outer peripheral surface of the semiconductive rubber layer, but streaky polishing marks were formed circumferentially on the outer peripheral surface.

Examples 2 and 3, and Comparative Examples 3 and 4

Semiconductive rollers were produced in substantially the same manner as in Example 1, except that the water-resistant polishing papers respectively had abrasive grain sizes of 50 μm (Comparative Example 3), 30 μm (Example 2), 20 μm (Example 3) and 15 μm (Comparative Example 4).

The outer peripheral surfaces of the semiconductive rubber layers of the semiconductive rollers were each observed by a microscope, and it was confirmed that a multiplicity of projections were formed on the outer peripheral surface as each having substantially the seine surface shape as in Example 1 shown in FIG. 3.

<Measurement of Ten-Point Average Roughnesses>

Ten-point average roughnesses Rz1 and Rz2 were respectively measured axially and circumferentially of each of the outer peripheral surfaces of the semiconductive rollers produced in Examples and Comparative Examples in conformity with Japanese Industrial Standards JIS B0601$_{-1994}$ by means of SURFCOM (registered trade name) available from Tokyo Seimitsu K.K.

<Actual Machine Test>

The semiconductive rollers produced in Examples and Comparative Examples were each incorporated as a charging roller instead of an original charging roller in an image drum (ID-C4DC available from Oki Data Corporation) including a photoreceptor body and a charging roller constantly kept in contact with a surface of the photoreceptor body to be removably mounted in a color laser printer (S5900dn available from Oki Data Corporation).

Immediately after the image drum was assembled, the image drum was mounted in the color laser printer, and a halftone image and a solid image were printed for initial image evaluation.

In the evaluation, a semiconductive roller suffering from imaging failure was rated as unacceptable (×), and a semiconductive roller free from imaging failure was rated as acceptable (○).

After the image drum was mounted in the color laser printer, sheets were transported through the image drum at 2000 sheets/day for 7 days, and then five halftone images and five solid images were sequentially printed for post-sheet-transportation image evaluation.

In the evaluation, a semiconductive roller suffering from imaging failure during the sequential printing was rated as unacceptable (×), and a semiconductive roller free from imaging failure during the sequential printing was rated as acceptable (○).

The post-sheet-transportation image evaluation was not performed on the semi conductive roller suffering from the imaging failure in the initial image evaluation.

The semiconductive rollers of Examples 1 to 3 and Comparative Examples 3 and 4 were each incorporated in the image drum with the apexes of the projections or the outer peripheral surface oriented forward in the direction of the rotation of the charging roller (forward direction) and with the apexes of the projections on the outer peripheral surface oriented rearward in the direction of the rotation of the charging roller (reverse direction) and, in these states, the actual machine test was performed.

The evaluation results are shown in Tables 2 and 3.

TABLE 2

| | Comparative Example 3 | Example 1 | Example 2 |
|---|---|---|---|
| Polishing | | | |
| Method | Dry + Wet | Dry + Wet | Dry + Wet |
| Oscillation | Done | Done | Done |
| Abrasive grain size (μm) | 50 | 40 | 30 |
| Ten-point average roughnesses (μm) | | | |
| Axial direction Rz1 | 13.2 | 9.3 | 7.8 |
| Circumferential direction Rz2 | 10.1 | 5.6 | 4.7 |
| Evaluation | | | |
| Incorporating orientation | Forward Reverse | Forward Reverse | Forward Reverse |
| Initial image | x   x | ○   ○ | ○   ○ |
| Post-sheet-transportation | —   — | ○   x | ○   x |

TABLE 3

| | Example 3 | Comparative Example 4 | Comparative Example 1 | Comparative Example 2 |
|---|---|---|---|---|
| Polishing | | | | |
| Method | Dry + Wet | Dry + Wet | Dry | Dry + Wet |
| Oscillation | Done | Done | — | Not done |
| Abrasive grain size (μm) | 20 | 15 | — | 40 |
| Ten-point average roughnesses (μm) | | | | |
| Axial direction Rz1 | 5.7 | 4.4 | 4.5 | 12.3 |
| Circumferential direction Rz2 | 4.1 | 3.5 | 6.0 | 9.6 |
| Evaluation | | | | |
| Incorporating orientation | Forward Reverse | Forward | — | — |
| Initial image | ○   ○ | ○ | ○ | x |
| Post-sheet-transportation | ○   x | x | x | — |

The results for Comparative Example 1 in Table 3 indicate that, where the outer peripheral surface of the semiconductive rubber layer is finished only by the dry polishing, the imaging failure due to the deposition of external additive particles occurs after the sheet transportation.

The results for Comparative Example 2 indicate that, where the outer peripheral surface of the semiconductive rubber layer is finished by the ordinary wet traverse polishing method in which the oscillation polishing is not performed after the dry polishing, the ten-point average roughnesses respectively measured axially and circumferentially of the outer peripheral surface are excessively great and, therefore, it is impossible to evenly electrically charge the surface of the photoreceptor body, thereby causing the imaging failure at the initial stage of the image formation.

On the other hand, the results for Examples 1 to 3 in Tables 2 and 3 indicate that, where the outer peripheral surface of the semiconductive rubber layer is finished by the wet oscillation polishing method after the dry polishing to form a multiplicity of projections each having the afore- mentioned specific surface shape, it is possible to achieve proper image formation without the imaging failure at the initial stage and after the sheet transportation. In order to provide this effect, however, the apexes of the projections should be oriented forward in the direction of the rotation of the charging roller (in the forward direction).

The results for Examples 1 to 3 and Comparative Examples 3 and 4 in Tables 2 and 3 indicate that, in order to form projections each having a projection height optimal for the aforementioned effect on the outer peripheral surface of the semiconductive, rubber layer, the water-resistant polishing paper to be used for the wet oscillation polishing should have an abrasive grain size of not less than 20 μm and not greater than 40 μm.

This application corresponds to Japanese Patent Application No. 2014-122556 filed in the Japan Patent Office on Jun. 13, 2014, the disclosure of which is incorporated herein by reference in its entirety.

What is claimed is:

1. A process for producing a semiconductive roller comprising:
    at least one tubular semiconductive rubber layer made from a semiconductive rubber composition and circumferentially rotatable in one rotation direction; wherein
    the semiconductive rubber layer has a multiplicity of minute projections which are formed from the semiconductive rubber layer and provided in circumferentially and axially discrete relation on an outer peripheral surface thereof; and
    the minute projections each have a surface shape which has an apex located forward in the rotation direction and two edges extending from the apex rearward in the rotation direction obliquely with respect to the rotation direction so that the projections are each flared with a width thereof progressively increasing in a rearward direction from the apex as measured axially of the semiconductive roller,
    the process comprising the steps of:
    rotating the semiconductive rubber layer having the outer peripheral surface yet to be formed with projections in one rotation direction;
    supplying a liquid to the semiconductive rubber layer;
    keeping a water-resistant polishing paper having an abrasive grain size of not less than 20 μm and not greater than 40 μm in contact with the outer peripheral surface; and
    while reciprocally finely moving the water-resistant polishing paper axially of the semiconductive rubber layer, relatively moving the water-resistant polishing paper along the entire axial length of the semiconductive rubber layer to wet-polish the outer peripheral surface.

2. The process for producing a semiconductive roller according to claim 1, wherein the semiconductive roller has an oxide film provided in the outer peripheral surface.

3. The process for producing a semiconductive roller according to claim 1, wherein the semiconductive roller is incorporated as a charging roller in an electrophotographic image forming apparatus for electrically charging a surface of a photoreceptor body.

4. The process for producing a semiconductive roller according to claim 1, wherein
    the water-resistant polishing paper has a press-in depth with respect to the outer peripheral surface that is 0.3 to 1.0 mm as measured from a position of a contact between the water-resistant polishing paper and the outer peripheral surface to erase polishing marks formed by dry polishing, and the water-resistant polishing paper feeding speed is 10 mm/minute.

5. The process for producing a semiconductive roller according to claim 1, wherein the reciprocal fine movement width is 6 mm, the reciprocal fine movement speed is 4000 mm/second, and the water-resistant polishing paper feeding speed (traverse speed) with respect to being fed axially of the semiconductive rubber layer is 150 mm/minute.

* * * * *